United States Patent [19]
Filloux

[11] 3,988,718
[45] Oct. 26, 1976

[54] LOGIC CONTROL SYSTEM

[75] Inventor: Gérard Filloux, Chevilly Larue, France

[73] Assignee: Compagnie Industrielle des Telecommunications Cit-Alcatel, Paris, France

[22] Filed: Dec. 13, 1974

[21] Appl. No.: 532,571

[30] Foreign Application Priority Data
Dec. 20, 1973 France .................. 73.45710

[52] U.S. Cl. ............... 340/172.5; 179/175.2 C
[51] Int. Cl.² ............................ G05B 11/00
[58] Field of Search ......... 340/172.5; 179/175.2 C

[56] References Cited
UNITED STATES PATENTS

| | | | |
|---|---|---|---|
| 3,702,989 | 11/1972 | Provenzano et al. | 340/172.5 |
| 3,753,243 | 8/1973 | Ricketts, Jr. et al. | 340/172.5 |
| 3,854,125 | 12/1974 | Ehling et al. | 340/172.5 |

*Primary Examiner*—Gareth D. Shaw
*Assistant Examiner*—C. T. Bartz
*Attorney, Agent, or Firm*—Sughrue, Rothwell, Mion, Zinn & Macpeak

[57] ABSTRACT

Control system enabling the monitoring of a set of elements, more particularly a multi-recorder ensuring the monitoring of the junctors in a telecommunications exchange, comprising a live memory containing the data reflecting the situation of the elements, annex circuits enabling the distributing and processing of the said data and logic operators preferably formed with diode matrixes receiving simultaneously outside data coming from the monitored elements and internal data coming from the memory and ensuring the internal monitoring of the system and the monitoring of the said elements.

6 Claims, 5 Drawing Figures

LOGIC CONTROL SYSTEM

The present invention concerns a logic control system comprising one or several logic blocks which may be connected with a live memory and enable the monitoring of the automatic operation of an element or set of elements or machines, contingently in co-operation with other monitoring elements. That invention is applicable in industry to the controlling of electrical elements, automatic devices or machine-tools and in particular in switching exchanges for the monitoring of one or several sets of elements, more particularly junctors.

The aim of the invention is to produce a control system enabling the effective monitoring of a set of elements to be monitored, such as junctors of a telecommunications exchange.

The invention has for its object a control system comprising one or several logic blocks (ME, MD) each formed by an "AND" operator, an "OR" operator and a certain number of inverters, connected with annex circuits (CP, ADT, ADN, AC, AE) for directing and processing the data monitored by the system and possibly with a memory (M) containing data reflecting the instantaneous situation of the monitored elements.

The logic blocks (ME-MD) receive, as input variables, the outside data coming from the monitored elements (J) and contingently from other monitoring elements (G, OP, AUX) and the data internal to the system and fulfilling logic functions of the said variables so as to respond to all situations by orders enabling the internal monitoring of the system, the monitoring of the controlled elements (J) and the connections of the system with the other monitoring elements.

The logic control block enables the fulfilling of all the logic functions of the variables constituted by the data coming from the memory, the annex circuits, the monitored elements and contingently other monitoring systems. It may thus respond to all situations by orders enabling simultaneously the internal monitoring of the system and the monitoring of the external elements. In order to generate these functions, the system according to the invention uses "NO", "AND" and "OR" operators acting successively.

The "NO" operator is formed in a known manner by inverters. The "AND" and "OR" operators are formed separately for example with diode matrixes or with memories. In the embodiment described, diode matrixes are used.

The memory, when the system is to monitor a great number of elements, is preferably a live memory, connected with a counter enabling the addressing of the monitored elements. Its cycle must be sufficiently short for the sampling of the data, sent at each cycle by each of the elements, to allow the analysing of any change in state. In particular, that sampling should allow the analysing of digital data such as a dialling train coming from the dial of a telephone, or data transmitted by an automatic device or a machine.

Lastly, the "annex circuits" part comprises a certain number of known electronic elements such as coders, adders, distributors, comparators.

The characteristics of the invention will be fully understood on referring to the following description of an embodiment of the invention, given by way of an example, relating to a control system assigned to the monitoring of the junctors in a telephone exchange. That system, called, in the following part of the text, a logic system, acts in connection with the other control elements of the exchange effecting, more particularly, the monitoring of the connection network, operators' desks and various other elements.

The following figures are given in support of that description:

Figure 1:
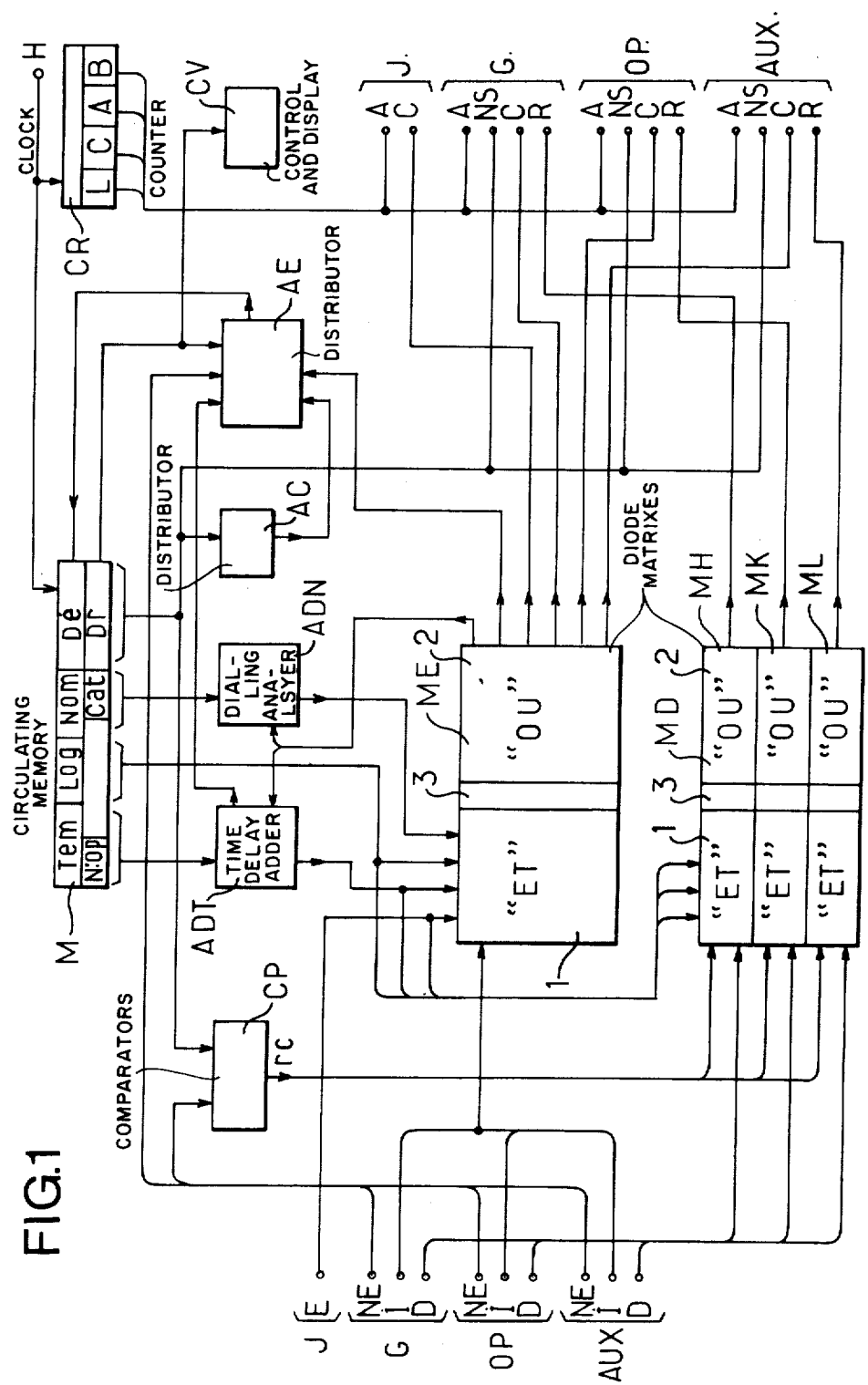
FIG. 1 shows diagrammatically the logic system as a whole.

The logic system shown in FIG. 1 is provided more particularly for monitoring 400 junctions in a private exchange. It comprises a circulating memory M comprising 1024 lines of 48 b. e. (binary elements). Data relating to a junctor takes up two lines, that is, a total of 800 lines used, it being possible to use the remaining 800 lines for other functions, for example control operations. A counter CR, rotating in synchronism with the memory, under the control of a common electronic clock connected to the point H, enables the generating of the addresses of the junctors. The junctors arranged on printed circuit cards are referenced by a card number C, an alveolus number A, a rack number B. The counter CR generates two addresses per junctor each assigned to one of the memory lines reserved for the junctor and referenced by a line number L1 or L2 represented by L in FIG. 1.

The memory M used, produced according to C/MOS integrated circuit techniques, has a cycle of 20 milliseconds, that is, every 20 ms, each junctor, at the instant when its address in generated by the counter CR, transmits to the logic system the data enabling the bringing up to date of the memory lines assigned to that junctor and to effect logic operations based on this data.

The data recorded in the memory M is as follows:

Line 1

Time delay (Tem): Period during which the state of the corresponding junctor has not varied. When that period exceeds a value recorded in the logic block, the latter will set off an alarm or a disconnection.

Logic state of the junctor (Log): For example, free or engaged junctor, receiving dialling signals.

Dialling (Nom): Dialling pulses already received by the junctor.

Called subscriber's number ($Dé$).

Line 2

Operator's number (No. op) if the call requires the assistance of an operator.

Category and number of the calling subscriber (Cat. Dr).

Figure 3:
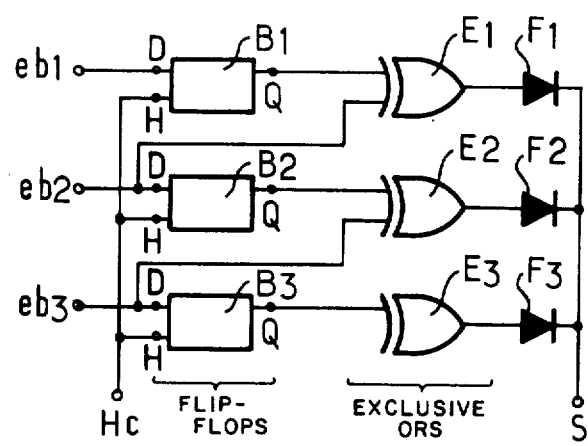
FIG. 3 is the diagram of a device for controlling the recording of the data in the memory.

This memory also has a data control and display device (CV) connected with it. That device enables the controlling of the proper recording of the binary elements in the memory. Free memory lines are used for that purpose, by recording a 1 in each line, shifted, at each line, by one binary position, for example, in the first b. e. of the first line, the second b. e. of the second etc. . . . Once that recording has been effected, a distributor AE enables the sending, in each line, of the contents of the preceding line shifted by one binary position. The control and display device CV comprises a control device shown in FIG. 3 The contents of a binary position of each line controlled (the position at which a 1 has originally been registered) is connected to the input D of a flip-flop of the D-type (B1 to B3) intended to memorize the state of that position "EXCLUSIVE OR" gates (E1 to E3) each make it possible to compare the data at the output of a flip-flop with the binary element ($eb2$ and $eb3$) existing at the input of the following flip-flop. The output of each gate E1 and E3 is connected up through a decoupling diode (F1 to F3) to a point S from which an error signal is sent. The clock inputs H of the flip-flops D are all controlled (point Hc) from the clock controlling the rotation of the memory. The display device on the other hand enables the displaying of the contents of a pre-determined line.

Figure 4:
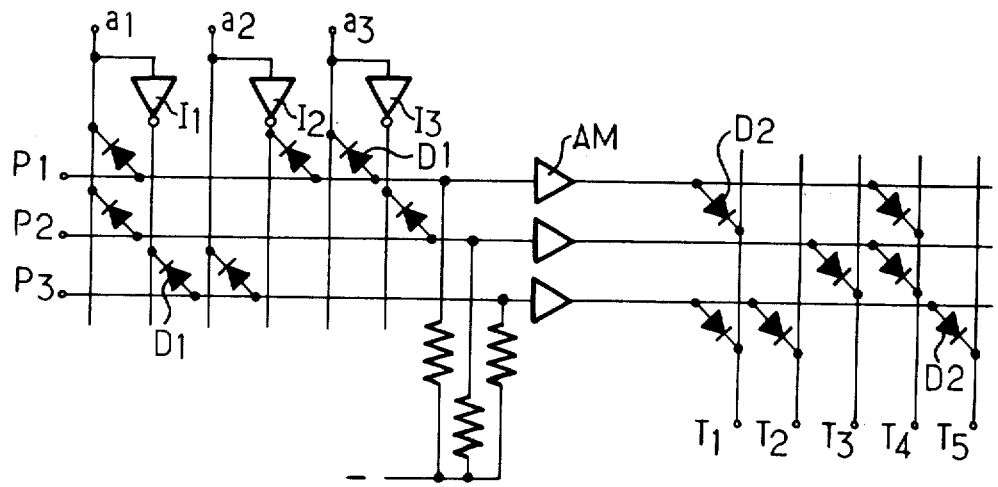
FIG. 4 is the diagram of a diode matrix of the logic block.

A logic analysis block comprising two diode matrixes ME-MD enables the analysing of a situation shown by a certain number of logic data items $a1, a2, a3 \ldots$ So that functions T1, T2 . . . . T5 to be fulfilled may be deduced therefrom. The diagram of a matrix is shown in FIG. 4. Each data item is transmitted to a column of the matrix and to the input of an inverter (I1 to I3) energizing a second column so as to fulfill the "NO" function. The "AND" function is obtained by diodes connecting each of these columns to certain lines of the matrix (diodes D1). For example the line P1 corresponding to the combination $a1.\overline{a2}.a3$.

The "OR" function is fulfilled by a group of diodes D2 connected up between each of the preceding lines (points P1, P2, P3 . . . ) and certain of the columns T1, T2 . . . constituting the outputs of the matrix. The column T1, for example, enables a control signal to be sent out when there is a signal at P1 or P3, that is, with the logic condition $a1.\overline{a2}.a3 + a1.\overline{a2}$.

The number of the columns controlled from a same line (P1, P2 . . . ) may be great and it is then necessary to provide, on each line, an amplifier AM. The first of these two matrixes, called the state matrix ME (FIG. 1) receives directly the data coming from a junctor J whose address is indicated by the counter CR by the harnesses of wire connecting the input E of the system to the matrix ME.

The matrix ME also receives data coming from the wired circuits ADT, ADN as well as from other parts of the exchange. FIG. 1 relates to the case where the exchange comprises monitoring elements for the connection network G, operatormonitoring traffic elements OP and auxiliary elements AUX monitoring a certain number of calls bringing into play, for example, transfer circuits or PBX lines (wires coming from these elements and connecting data input points I to the matrix).

All this data is received by an "AND" circuit situated in the part 1 of the matrix ME and transmitted by the amplifier stage 3 to the "OR" circuit 2. At the output of ME, the orders are sent towards the wired circuits AE, ADT, ADN and towards the control points C connected to the junctors J and to the elements mentioned above (G, OP, AUX). These elements also receive (addressing points A) the address of the junctor generated by the counter CR. This data (control C and address A) enables these elements to proceed with the various selections.

The second diode matrix, called, in the following part of the text, request matrix MD, makes it possible to respond to request for work made by the monitoring elements G, OP, AUX. As the requests may be simultaneous, the matrix of the requests is divided into sub-matrixes MH, MK, ML, each assigned to one of these control elements. The data received by these sub-matrixes is as follows:

a. Requests coming from these control elements (wires D) and each reaching the sub-matrix concerned;

b. Data coming from the memory M and from the wired circuits. The columns corresponding to this data may be common to all the sub-matrixes and also be multipled on corresponding columns of the matrix ME;

c. Comparison results rc coming from a group of comparators CP; to reply to the order request from a monitoring element, the logic system must ensure that the communication processed by the requesting element effectively concerns the subscriber whose number is recorded in the memory on the line being read (calling number Dr or called number Dé). In the example shown, the group of comparators CP compares the number in the memory with the three numbers sent out by the elements G, OP, AUX (wires NS and NE) and transmits to each one of the sub-matrixes MH, MK, ML the result of the comparison concerning it. The response to each request is sent to the requesting monitoring element (wires R) when that request can be satisfied.

Figure 5:
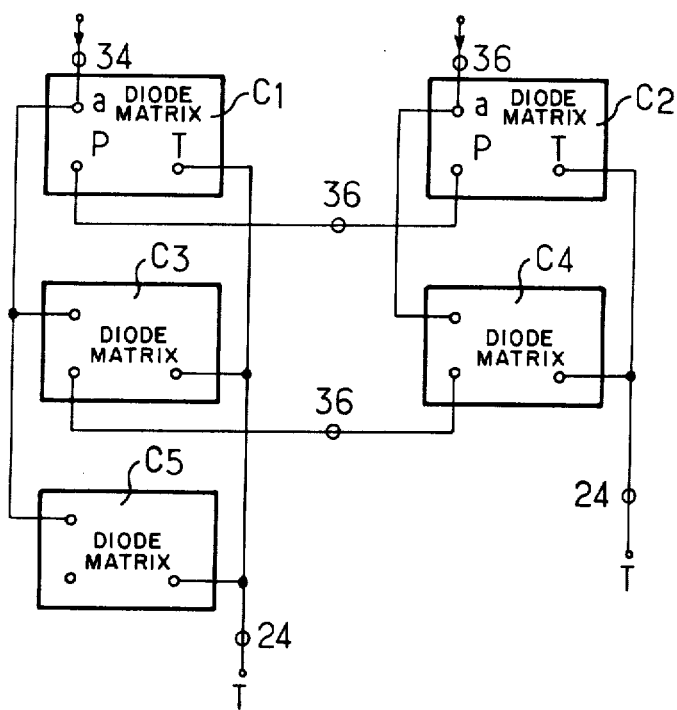
FIG. 5 shows diagrammatically a group of matrixes.

The diode matrixes are, to great advantage, formed on printed circuit cards, the lines being, for example, cut in one face of the card and the columns being cut in the other face. The logic unit is formed by plugging in diodes, this enabling any modifications to be made without touching the wiring. A card makes it possible, for example, to form 36 data inputs with 24 control outputs and 36 lines. Several of these cards can be grouped together to form larger matrixes. The logic system uses, for example, five cards C1 to C5 grouped together in two rows as shown in FIG. 5:

The cards of the same row (for example C1, C3 C5) have their inputs $a$ multiplied, as are the outputs T. That multipling is not necessarily complete, certain data or certain orders not compulsorily concerning lines of all cards. Nevertheless, a partial multipling, which enables a reduction in the number of columns, reduces by as much the possibilities of modifications;

Cards of the same order in the various rows have their input lines P multiplied. In the example given, the second row is incomplete, there being no connection between the lines of the card C5 and the points T commun to the cards C2 and C4.

A similar logic block may also be formed with memories. The combining of two memories indeed makes it possible to replace a complete matrix, each line of the matrix corresponding to an address in each of the two memories. The memories fulfilling the "OR" function should be directly addressable, the memory fulfilling the "AND" function being addressable by the contents (that is, by the data $a1, a2, a3 \ldots$ from which a line address P1, P2 is determined).

The last part of the logic system, the wired or annexed cables, is monitored by the logic block ME, MD. These circuits comprise the following elements in a known manner in an intergrated circuit configuration:

a. Adders ADT and ADN

A time delay adder ADT in connection with the memory M, the matrixes ME and MD and the distributor AE: when a state is held in a junctor, the adder receives, at each cycle memory cycle, the time delay recorded in the memory and increments it by a certain value (for example $+ 1$). When the time delay reaches a limit value recorded in the logic block, an order is sent by the latter, for example a releasing order.

Figure 2:
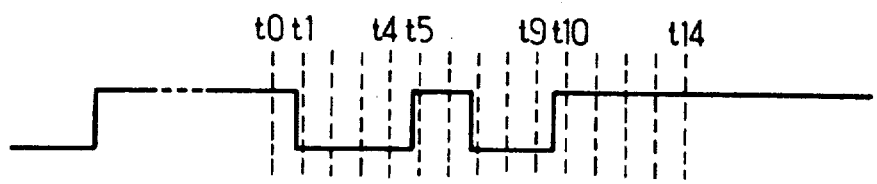
FIG. 2 is a dialling data analysis diagram.

A dialling analyser ADN in connection with the memory M and the operators "AND" and "CR" of the matrix ME: that adder enables the recording of the dialling by analysis of the changes in state of the line, in general line cuts generated by the dialling. The standards universally used (cuts of 66 or 50 ms separated by 33 or 50 ms for a same figure, with intervals between figures equal to at least 100 ms) make that analysis possible with a memory cycle of 20 ms. A dialling diagram corresponding to the FIG. 2 is given in FIG. 2. Conventionally, the state 0 corresponds to a line cut and the state 1 corresponds to a loop. Sampling instants $t0$ to $t14$ have been shown.

That analyser ADN uses the zone of the memory M reserved for dialling (Num). That zone is divided into three registers enabling the memorizing of the successive states of the line, that is, the state 0 (register RO), the state 1 (register R1) and the digit being received (register RC). The operation thereof is as follows:

The detection of the state 1 causes the incrementing of the register R1 ($t0$, $t5$, $t10$);

The detection of two successive states 0 after the incrementing of R1 causes the incrementing of RO and the resetting to zero of R1 ($t1-t2$ and $t5-t6$);

The detection of the state 0 – state 1 sequence causes the resetting to zero of RO and R1 and the incremeting of RC ($t4-t5$ and $t9-t10$);

The detection of 5 successive states 1 ($t10$ to $t14$) causes the sending of the figure contained at RC to the memory zone reserved for the called number (Dé), through a figure distributor AC enabling that figure to be placed in the proper position in the memory zone Dé and the resetting to zero of RC.

b. Distributors AC and AE

The figure distributor AC mentioned above in connection with the memory M and the distributor AE and the terminals C;

A memory input distributor AE connected to the adder ADT, to the input terminals NE of the elements G, OP, AUX, to the memory M (line 1 and line 2), to the distributor AC, to the matrix ME, enabling, at each cycle, a choice between the insertion of new data in the line being read and the regenerating of the data contained. This new data comes from the matrix of the states ME, from the wired circuits or form the other monitoring elements of the exchange (for example the called subscriber number or calling subscriber number may come from the elements G, OP, AUX);

c. The group of comparators CP

Coders forming logic combinations of the data before the bringing thereof into the logic block are connected with certain of the elements of the wired cables. Indeed, it is very rare that there has been a need for all the logic combinations of the data and a previous coding enables a considerable reduction in the number of columns of the matrix ME, to the detriment, it is true, of the flexibility of adaptation to subsequent modifications.

The wired circuits may also comprise a charge adder, not shown. Indeed, the logic system described is suitable for effecting the charging of the calls, for example, by analysis of the charge pulses coming for the junctors. It would be sufficient, for that purpose, to provide an adder, memory positions in the memory zone reserved for each element and analysis and control columns in the logic block. The system described is particularly interesting in installations requiring a frequent modification of the cases of use, for the adjusting of installations and for the manufacturing of prototypes. The system may also be used as a simple logic analysis block, without a live memory and operate in the asynchronous mode. That may be the case, for example, for the controlling of an automatic device or of a machine-tool. It must be understood that the invention is in no way limited to the application described. Without going beyond the scope of the invention, the elements described could be replaced by other equivalent elements fulfilling the same function and a technology suitable for the application required could be used.

I claim:

1. Logic control system enabling the monitoring of the automatic operation of the elements or of a set of elements, and capable of co-operating with other control or monitoring units, more particularly in telecommunications for the monitoring of a set of junctors, the system comprising, a memory containing data reflecting the situation of the monitored junctors, an addressing counter, each position of the counter addressing a corresponding junctor and at least one word of the memory containing data concerning the addressed junctor, the system further comprising a first logic assembly formed by an "AND" logic circuit, an "OR" logic circuit and inverters, auxiliary circuits receiving data from the memory and from the logic assembly for updating the memory data, the said first logic assembly receiving as input variables data from the monitored junctors, from said auxiliary circuits, from the memory and from said other control or monitoring units and delivering as output variables Boolean functions of said input data, the outputs of the logic assembly being connected to said junctors, auxiliary circuits, memory and other control or monitoring units.

2. Logic system according to claim 1, wherein said memory is a circulating memory, said memory and said counter being operated in synchronism by a clock enabling the cyclic addressing of said junctors and the sampling of the data sent by said junctors, said auxiliary circuits comprising a dialling analyser receiving decimal data emitted in the pulse mode by the junctors and transmitted by the first logic assembly and updating a first part of the said memory word affected to the addressed junctor for registering said decimal data, and said auxiliary circuits further comprising at least one adder circuit connected to the memory for totalizing data items emitted by the addressed junctor and stored in a second part of the memory word.

3. Logic system according to claim 1 for use in a telecommunication exchange, for monitoring a set of junctors and for co-operating with different monitoring systems of the said exchange, comprising a second logic assembly receiving data and requests of orders from said different monitoring systems and delivering data and orders to said different monitoring systems, the inputs of the second logic assembly being connected to the memory, to the said auxiliary circuits and to the said different monitoring systems, and the outputs of the second logic assembly being connected to the different monitoring systems.

4. Logic system according to claim 1, wherein each logic assembly is formed by a certain number of modules comprising and "AND" circuit and or "OR" circuit formed by diode matrixes, a certain number of inverters and connection amplifiers, these modules being grouped on printed circuit cards making it possile to make modifications to the logic unit by simple movement of the diodes without changing the wiring and to increase the analysing capacity of the logic unit by combining therewith several modules.

5. Logic system according to claim 1, wherein each logic assembly is formed by a number of modules comprising an "AND" circuit, an "OR" operator, inverters and amplifiers, these modules being produced in an integrated circuit configuration.

6. Logic system according to claim 1, further comprising a control device for controlling the recording and the regeneration of the data of said memory, including a shifting device and a comparison device, the shifting device using free adjacent words of the memory in which are originally recorded identical data equally shifted from the first to the last of the said free words and including a distributor enabling the transfering and shifting of said identical data from each word to the next word, and the said comparison device including a set of flip-flops for registering data contained in the said memory words at a given time and a set of comparators to detect any difference between data registered in the flip-flops and the data contained in the memory of the next address of the memory.

* * * * *